(12) United States Patent
Ting et al.

(10) Patent No.: US 7,771,229 B2
(45) Date of Patent: Aug. 10, 2010

(54) ELECTRICAL CARD CONNECTOR ASSEMBLY

(75) Inventors: Chien-Jen Ting, Tu-cheng (TW); Hung-Chi Yu, Tu-cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/322,582

(22) Filed: Feb. 3, 2009

(65) Prior Publication Data

US 2009/0197472 A1 Aug. 6, 2009

(30) Foreign Application Priority Data

| Feb. 4, 2008 | (TW) | ................. 97104107 A |
| Feb. 25, 2008 | (TW) | ................. 97106403 A |
| Mar. 24, 2008 | (TW) | ................. 97110318 A |

(51) Int. Cl.
*H01R 13/60* (2006.01)

(52) U.S. Cl. ................. 439/540.1; 439/541.5

(58) Field of Classification Search ............ 439/637, 439/540.1, 541.5
See application file for complete search history.

(56) References Cited

U.S. PATENT DOCUMENTS

| 5,411,416 | A | * | 5/1995 | Balon et al. ............... 439/639 |
| 5,545,057 | A | * | 8/1996 | Tan et al. ............... 439/540.1 |
| 5,676,569 | A | * | 10/1997 | Davis ............... 439/731 |
| 6,132,243 | A | * | 10/2000 | Hirata et al. ............... 439/541.5 |
| 6,511,345 | B1 | * | 1/2003 | Hwang ............... 439/541.5 |
| 6,540,551 | B1 | * | 4/2003 | Wang ............... 439/541.5 |
| 6,761,584 | B2 | * | 7/2004 | Li ............... 439/540.1 |
| 6,884,085 | B1 | * | 4/2005 | Goldstone ............... 439/62 |
| 7,520,760 | B2 | * | 4/2009 | Margulis et al. ............... 439/79 |
| 2003/0109174 | A1 | * | 6/2003 | Korsunsky et al. ............... 439/541.5 |
| 2004/0002258 | A1 | * | 1/2004 | Zheng et al. ............... 439/541.5 |
| 2005/0255746 | A1 | * | 11/2005 | Hyland ............... 439/541.5 |
| 2006/0134984 | A1 | * | 6/2006 | Korsunsky et al. ............... 439/607 |
| 2006/0223365 | A1 | * | 10/2006 | Campbell ............... 439/540.1 |
| 2008/0070439 | A1 | * | 3/2008 | Kusuda et al. ............... 439/540.1 |
| 2008/0214045 | A1 | * | 9/2008 | Tu et al. ............... 439/540.1 |
| 2008/0261442 | A1 | * | 10/2008 | Ting ............... 439/541.5 |
| 2009/0029588 | A1 | * | 1/2009 | Neumetzler et al. ............... 439/540.1 |
| 2009/0170369 | A1 | * | 7/2009 | Yu et al. ............... 439/541.5 |

* cited by examiner

*Primary Examiner*—T C Patel
*Assistant Examiner*—Harshad C Patel
(74) *Attorney, Agent, or Firm*—Andrew C. Cheng; Wei Te Chung; Ming Chieh Chang

(57) ABSTRACT

An electrical card connector assembly (100) comprising: a first electrical card connector (1); a second electrical card connector (2) disposed below the first electrical card connector; a third electrical card connector (3); a fourth electrical card connector (4) arranged abreast with the third electrical card connector; a PCB (5) defining an upper surface (50) and a lower surface (51), the upper and lower surface having a plurality of traces, respectively; wherein the combined first and second card connector are disposed on the upper surface (50) of the PCB and electrically connected with the corresponding traces of the upper surface, and the third and fourth electrical card connector are arranged abreast on the lower surface of the PCB (5) and electrically connecting with the corresponding traces of the lower surface (51).

20 Claims, 6 Drawing Sheets

ELECTRICAL CARD CONNECTOR ASSEMBLY

BACKGROUND OF THE INVENTION

1. Field of the Invention

The present invention relates to an electrical card connector assembly, and in particular to an electrical card connector assembly mounted to a printed circuit board.

2. Description of Prior Arts the flash memory has a lot of advanced features, for example, strong computing function, faster storage and high scalability. And as the flash memory appears, it is deep loved by the most consumers immediately, because of said advanced characteristics. The SD card, MS card, CF card, XD card etc. are derivates of the flash memory. Currently, said cards are broadly used in electrical products like the digital camera, cellphone etc. as a memory storage. And every kind of card needs a special card connector to receive, usually, the electrical device needs to be mounted many kinds of electrical card connector to receive the different cards. The electrical device has to increase working procedures to install the electrical card connectors, and define many traces to correspond the electrical card connectors. The cost of the electrical device will increase, and the electrical device will lose the market by reason of the high cost.

Therefore, it is desirable to provide an electrical card connector assembly that eliminates the aforesaid problems.

SUMMARY OF THE INVENTION

Accordingly, an object of the present invention is to provide an electrical card connector assembly which saves assembly procedures and easy to assemble.

In the exemplary embodiment of the invention, an electrical card connector assembly comprising: a first electrical card connector; a second electrical card connector disposed below the first electrical card connector, the first and second electrical card connectors being arranged in a stack; a third electrical card connector; a fourth electrical card connector arranged abreast with the third electrical card connector; a PCB defining an upper surface and a lower surface, the upper and lower surfaces having a plurality of traces, respectively; wherein said combined first and second electrical card connectors are disposed on the upper surface of the PCB and electrically connected with the corresponding traces of the upper surface, and the third and fourth electrical card connectors are arranged abreast on the lower surface of the PCB and electrically connecting with the corresponding traces of the lower surface.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
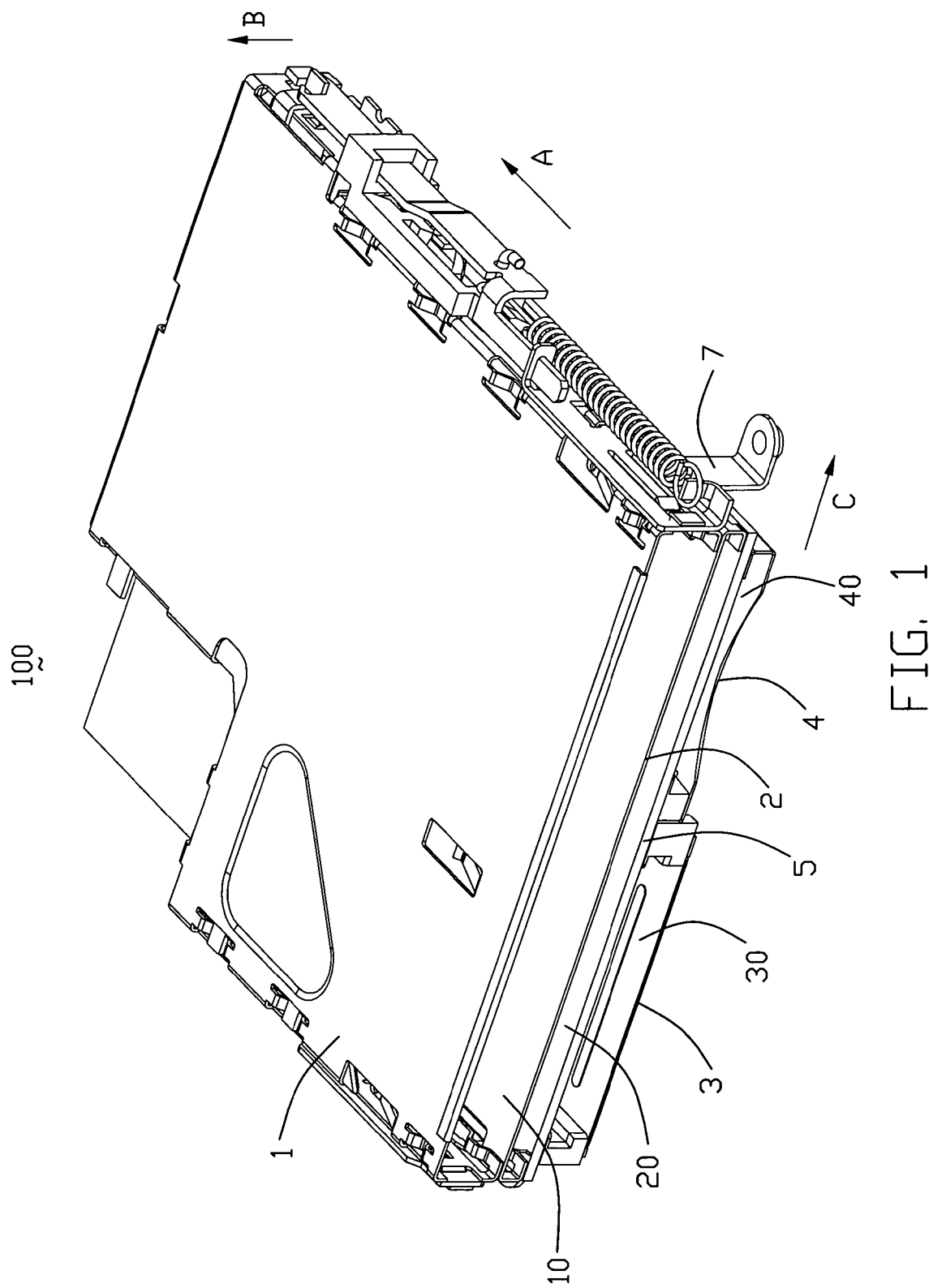
FIG. 1 is a perspective view of an electrical card connector assembly in accordance with the present invention.
Figure 5:
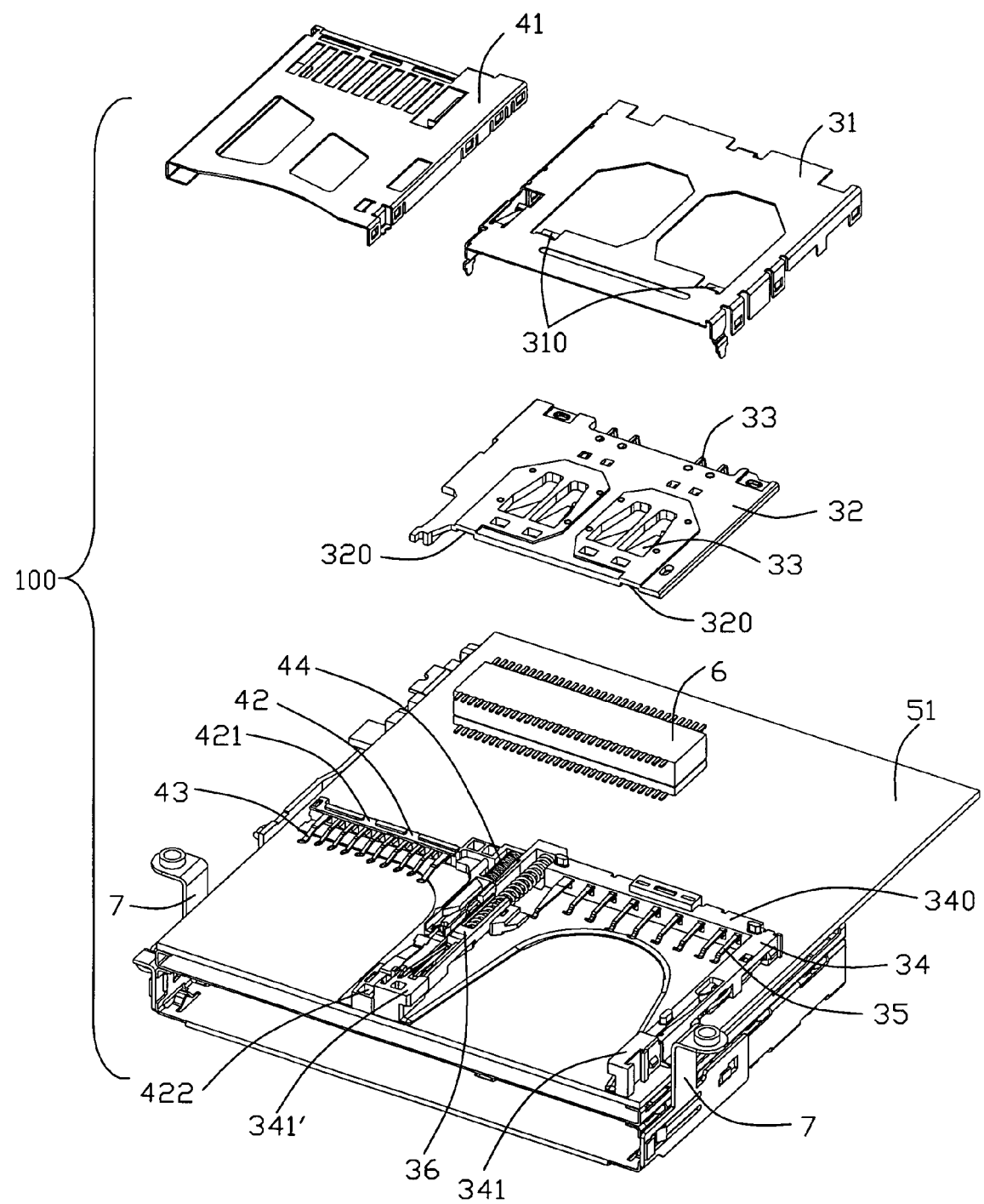
FIG. 5 is a partly exploded view of the electrical card connector according to the FIG. 4.

Referring to FIGS. 1 and 5, an electrical card connector assembly 100 comprises a PCB (Printed Circuit Board) 5, electrical card connectors and a connector 6 mounted on the PCB 5 and a stand off 7. The electrical card connector assembly 100 defines a card insertion direction A, an upright direction B and a transverse direction C, the direction A, direction B and direction C are perpendicular to each other. Said card connectors includes a first card connector 1, a second card connector 2, a third card connector 3 and a fourth card connector 4. The PCB 5 has a upper surface 50 and a lower surface 51, the first and second card connectors 1, 2 are mounted on the upper surface 50 of the PCB 5 stacked up along the upright direction B. The second card connector 2 is below the first card connector 1, and mounted on the PCB 5 directly. The third and fourth card connectors 3, 4 are mounted on the lower surface 51 of the PCB 5 side by side along the transverse direction C.

Figure 2:
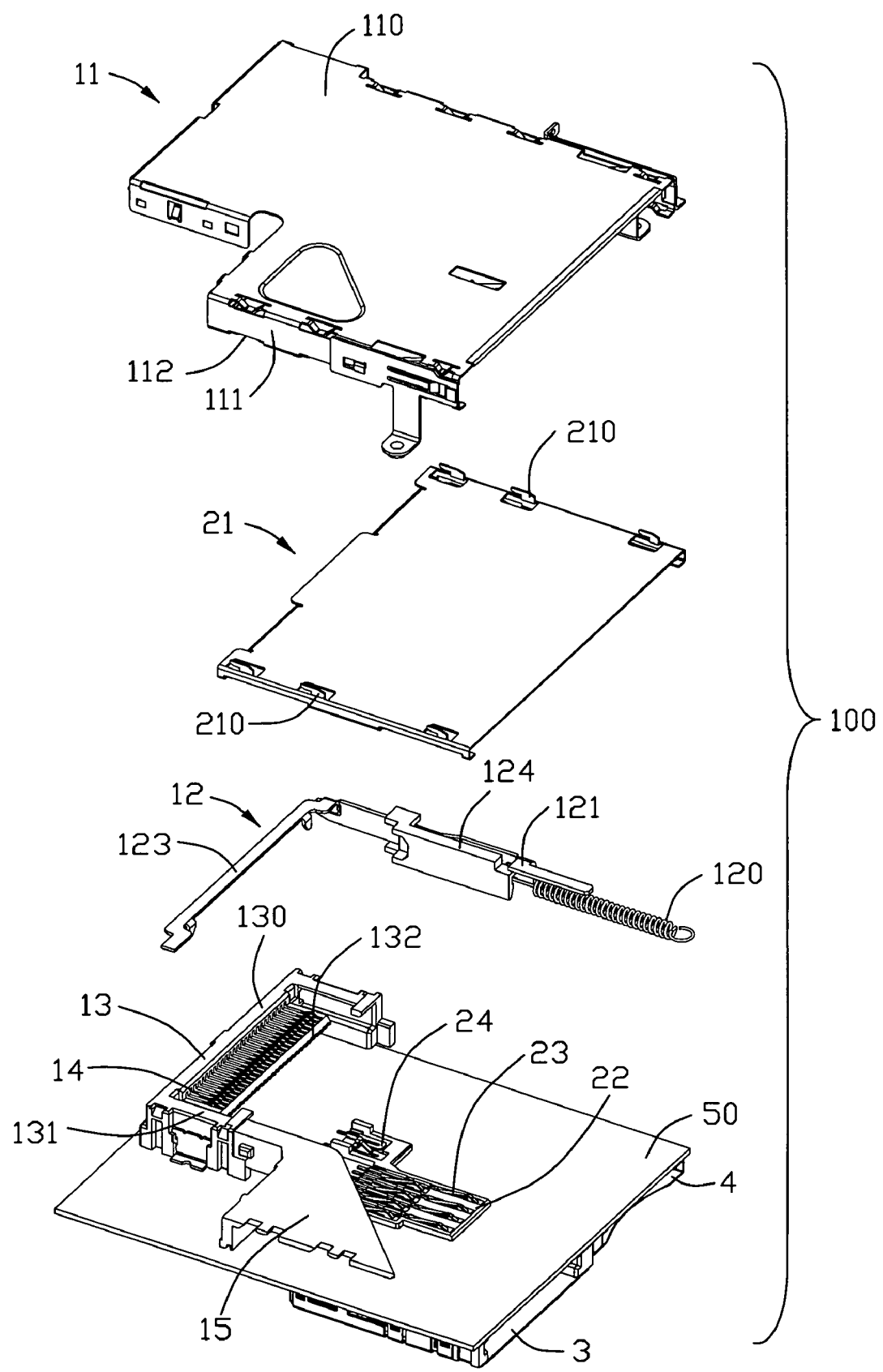
FIG. 2 is a partly exploded view of the electrical card connector.
Figure 3:
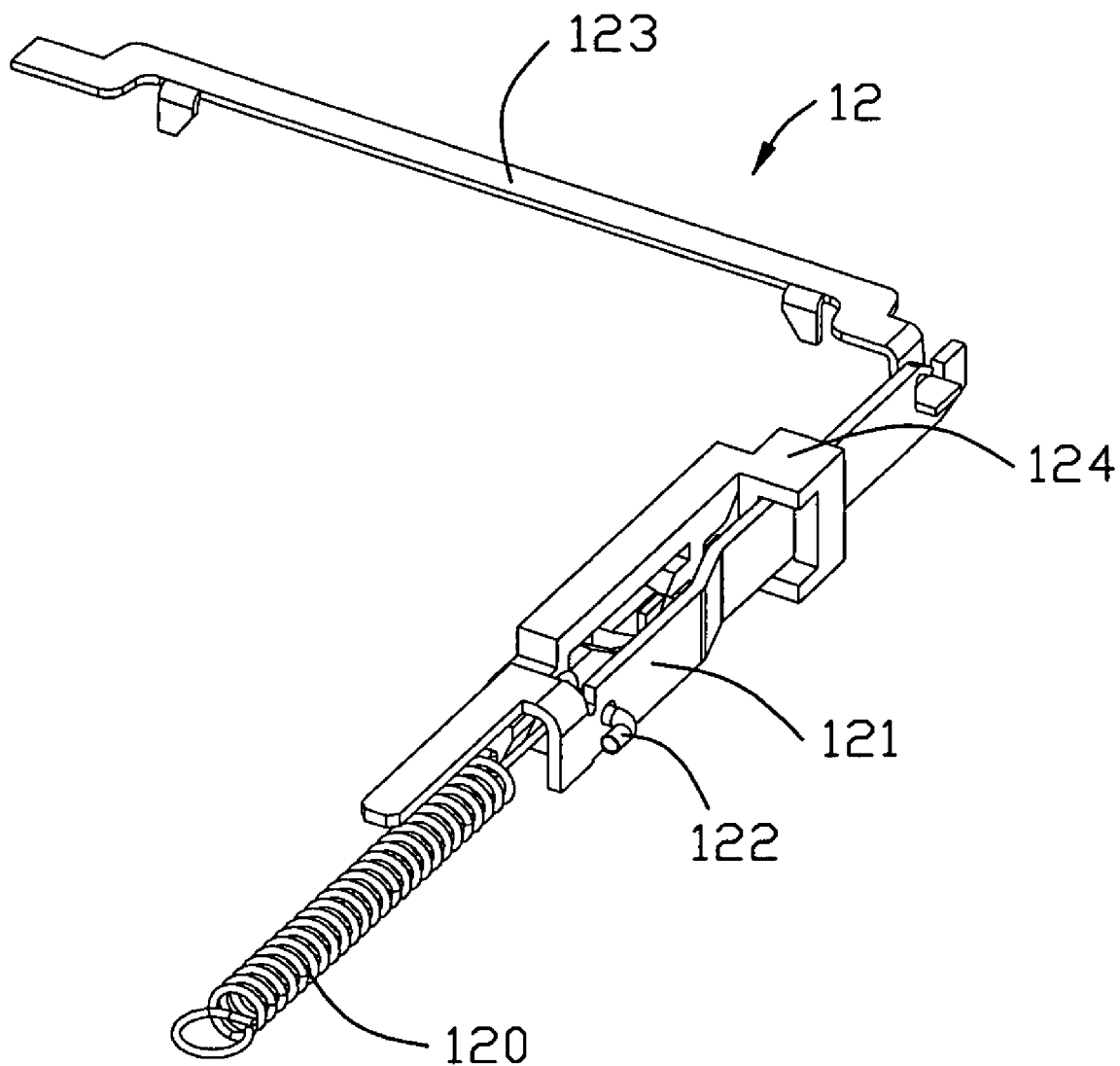
FIG. 3 is a perspective view of the first ejector.

Referring to FIG. 1 to 3, the first card connector 1 is configured of L-shape and comprises a first shell 11, a first insulative housing 13, a plurality of first terminals 14, a first ejector 12 and a guider 15. The first shell 11 defines a forward section (not labeled) and rearward section (not labeled), the first insulative housing 13 is assembled on the rearward section. The shell 11 and the first insulative housing 13 constitute a first card receiving space 10. The first insulative housing 13 has a rectangular base 130, a pair of extending arms 131 extended from the opposite sides of the base 130 along the card insertion direction A and a mating portion 132 extended from the base 130 between said pair of extending arms 131. The first plurality of terminals 14 are received in the base 130 and mating portion 132. The first shell 11 comprises an upper side 110 and lateral sides 111 extending form the upper side 110, the lateral sides 111 define a plurality of locking holes 112 adjacent to the forward section. Said guider 12 is configured of triangle disposed on a lateral side of the first card receiving space 10 to guide the electrical cards with different width insert into the first card receiving space 10. The first ejector 12 is assembled to the lateral side of the first shell 11 opposite to the guider 15. The first ejector 12 includes an ejection portion 123 inserting into the first card receiving space 10, a driving rod 121 connecting to the ejection portion 123, a cam follower 122, a spring 120 and an insulative block 124, the insulative block 124 forms a heart-shape groove (not shown), one point of the cam follower 122 slides in the heart-shape groove and the other point is rotatablely connected to the driving rod 121. So the driving rod 121 can be stick in a first position and a second position circularly to eject the electrical card from the first card receiving space 10.

The second card connector 2 is below the first card connector 1 and includes a second shell 21 and a terminal model 22. The shell 21 defines a second card receiving space 20, the terminal model 22 has a plurality of second terminals 23 arranged in two rows along the transverse direction C, and the plurality of second terminals 23 soldering to the PCB 5 directly. The opposite sides of the second shell 21 define a plurality of protrude portions 210 corresponding to the plurality of locking holes 112.

Figure 4:
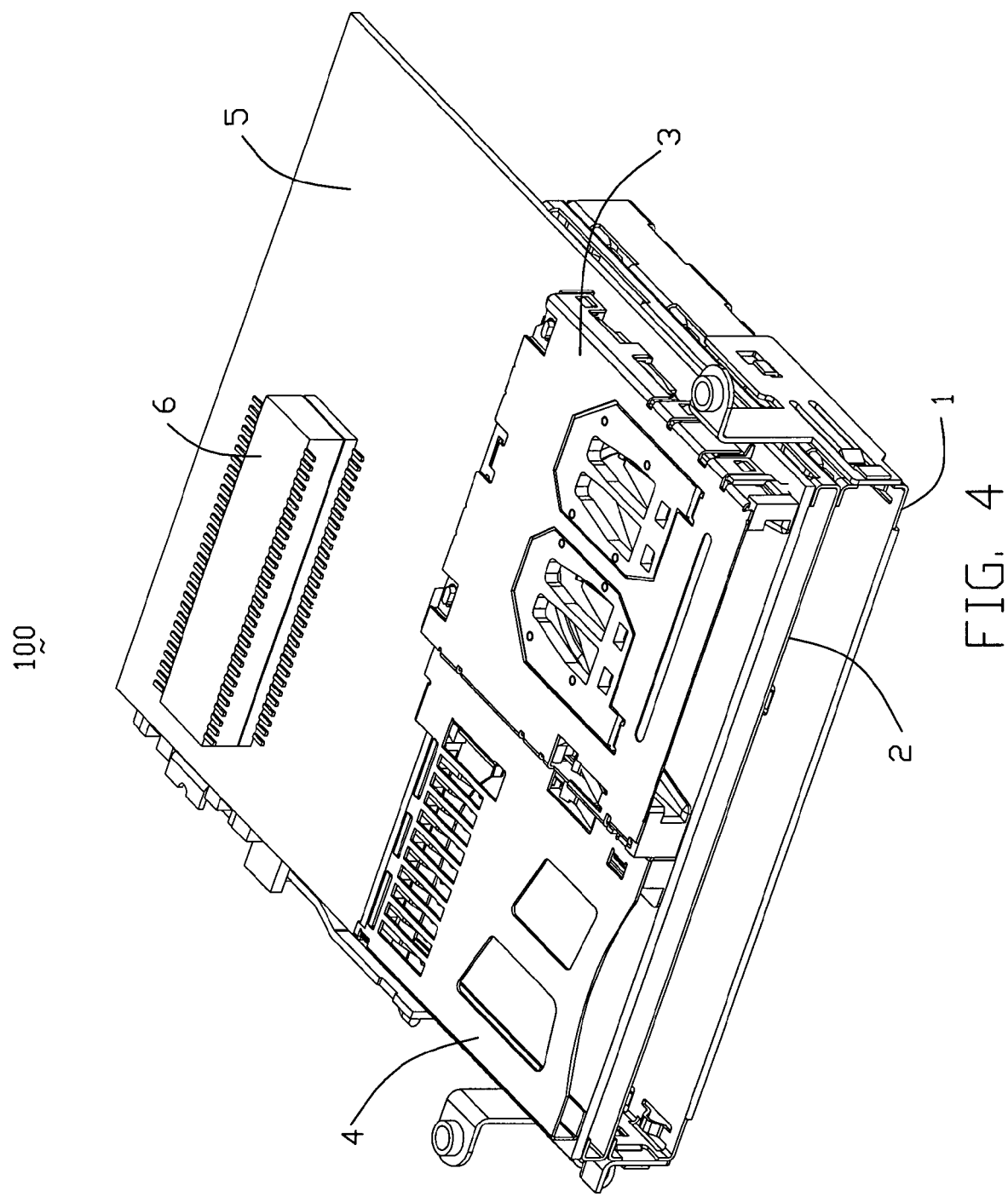
FIG. 4 is a perspective view of the electrical card connector assembly, as viewed from the other side according to the FIG. 1.
Figure 6:
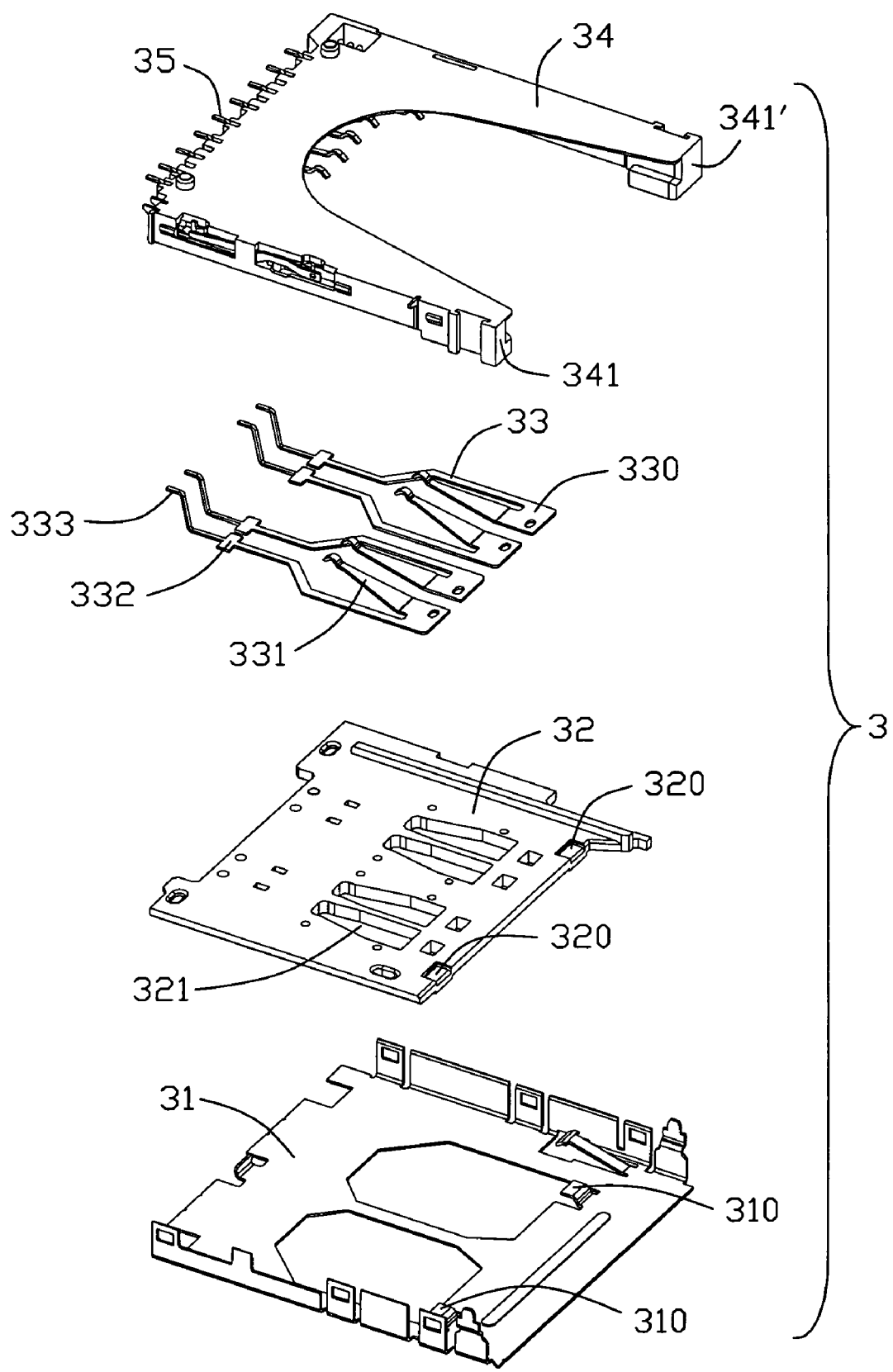
FIG. 6 is an exploded view of the third electrical card connector.

Referring to FIG. 4 to 6, the third card connector 3 is a N-in-1 card connector, the third card connector 3 includes a third shell 31, terminal board 32, insulative flame 34 and the third ejector 36. The insulative flame 34 involves a pair of lateral side wall 341 and a rear side wall 340, a plurality of third terminals 35 are received in the rear side wall 340. The terminal board 32 includes a plurality of assistant terminals 33, the plurality of assistant terminals 33 comprise a first assembly portion 330, a second assembly portion 332, a contacting portion 331 and a soldering portion 333 extending from the second assembly portion 332. The first assembly portion 330 and the second assembly portion 332 are assembled in the terminal board 32. The third shell 31 and the insulative flame 34 constitute the third card receiving space 30, and the top side wall of the third shell 31 defines a pair of retaining pins 310 protrude into the third card receiving space 30. A pair of retaining notches are formed on the forward edge of the terminal board 32 corresponding to said retaining pin 310 of the third shell 31, so the terminal board 32 can fix on the third shell 31 by the retaining pin 310 inserting into the retaining notches 320. The terminal board 32 defines a plurality of perforations 321 adjacent to the retaining notches 320, the contacting portions 331 of the assistant terminals 33 extend into the third card receiving space through said perforations 321. The third ejector 36 is disposed on one of the lateral side wall 341 to eject the different electrical cards from the third card receiving space 30.

The fourth card connector 4 comprises a fourth shell 41, a fourth insulative housing 42 and a fourth ejector 44. The fourth insulative housing 42 includes a fourth lateral side wall 422 and a fourth rearward side wall 421, a plurality of fourth terminals 43 are received in the fourth rearward side wall 421, and the fourth shell 41 covers on the fourth insulative housing 42, a fourth card receiving space 40 is constructed between the fourth shell 41 and the fourth insulative housing 42. The plurality of fourth terminals 43 cantilever in the fourth card receiving space 40. The fourth ejector 44 is disposed on the fourth side wall 422 of the fourth insulative housing 42. When the electrical card inserts into the fourth card receiving space 40, the electrical card is guided by the fourth side wall 422 and the one of the lateral sides (not labeled) of the fourth shell 41.

In the present invention, the tails of the first, second, third and fourth terminals 14, 23, 35, 43 are soldering to the PCB 5, the PCB 5 defines a plurality of traces (not shown) to electrically connect to said tails of the first, second, third and fourth terminals 14, 23, 35, 43. The BTB connector electrically connect to the first, second, third and fourth terminals 14,23, 35,43 via the traces of the PCB 5.

The first, second, third and fourth card connectors 1, 2, 3, 4 are all soldered to the PCB 5, the PCB 5 is a integrated PCB. The number of electrical card connectors referring to said electrical card connector assembly of the present invention can be more than four or less than four. In a word, the different kinds of electrical card connectors are arranged on the integrated PCB 5, and then electrically connect to an other electrical device through the BTB connector 6. So, the electrical device just needs to prepare a mating connector to receive said BTB connector 6, the working procedures of the electrical device will be decreased.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical card connector assembly comprising:
   a first electrical card connector;
   a second electrical card connector disposed below the first electrical card connector, the first and second electrical card connectors being arranged in a stack;
   a third electrical card connector;
   a fourth electrical card connector arranged abreast with the third electrical card connector;
   a PCB defining an upper surface and a lower surface, the upper and lower surfaces having a plurality of traces, respectively;
   wherein said combined first and second electrical card connectors are disposed on the upper surface of the PCB and electrically connected with the corresponding traces of the upper surface, and the third and fourth electrical card connectors are arranged abreast on the lower surface of the PCB and electrically connecting with the corresponding traces of the lower surface.

2. The electrical card connector assembly as claimed in claim 1, wherein the first card connector comprises a shell, the shell comprises a rearward section and a forward section, and the width of the rearward section is larger than the width of the forward section.

3. The electrical card connector assembly as claimed in claim 2, wherein the second card connector comprises a plurality of terminals, and the terminals are arranged in two rows.

4. The electrical card connector assembly as claimed in claim 3, wherein the third electrical card connector comprises a plurality of terminals and assistant terminals, the terminals and the assistant terminals form contacting portions, respectively, and the contacting portions of the terminals and the assistant terminals extend along opposite directions.

5. The electrical card connector assembly as claimed in claim 4, wherein the third electrical card connector further comprises a third electrical inuslative housing, a terminal board and a third shell, said terminals are received in the third insulative housing, and the assistant terminals are received in the terminal board.

6. The electrical card connector assembly as claimed in claim 5, wherein the terminal board is assembled to the shell, and the shell covers on the third insulative housing.

7. The electrical card connector assembly as claimed in claim 1, further comprising a BTB connector, the BTB connector electrically connecting with the corresponding traces of the PCB.

8. The electrical card connector assembly as claimed in claim 7, wherein the first, second, third and fourth electrical card connectors are electrically connected with the BTB connector, respectively, by the corresponding traces of the PCB.

9. An electrical card connector assembly comprising:
   a first printed circuit board defining opposite first and second surfaces thereof;
   at least a first level connector mounted upon the first surface and defining a first level card receiving space horizontally communicating with an exterior;
   at least a second level connector mounted upon the second surface and defining a second level card receiving space horizontally communicating with the exterior;
   a first transition connector mounted upon the second surface and defining a first mating port vertically communicating with the exterior;
   a second printed circuit board vertically spaced from the first printed circuit board in a parallel relation, and defining opposite first and second faces thereof under condition of said first face of the second printed circuit board communicatively facing the second surface of the first printed circuit board; and
   a second transition connector mounted the first face of the second printed circuit board and defining a second mating port vertically communicating with the exterior so as to be mated with the first transition connector.

10. The electrical card connector assembly as claimed in claim 9, wherein the said first level connector includes a metallic shell to define a card receiving cavity therein, and said metallic shell is equipped with a mounting leg to abut against and secured to the first face of the second printed circuit board.

11. The electrical card connector assembly as claimed in claim 10, wherein said second level connector is vertically spaced from the first face of the second printed circuit board.

12. The electrical card connector assembly as claimed in claim 10, wherein the combined first printed circuit board and the associated first level connector and second level connector are supported upon the first face of the second printed circuit board via the mounting leg and the mated first and second transition connectors.

13. The electrical card connector assembly as claimed in claim 9, wherein the first level card receiving space and the second level card receiving space are vertically separated from each other by said first printed circuit board.

14. The electrical card connector assembly as claimed in claim 9, further including another second level connector mounted to the second surface of the first printed circuit board beside said second level connector, and defining another second level card receiving space, wherein a sum of said second level card receiving space and said another second level card receiving space is smaller than the first level card receiving space.

15. The electrical card connector assembly as claimed in claim 14, wherein both said second level card receiving space and said another second level card receiving space are thinner than said first level card receiving space.

16. The electrical card connector assembly as claimed in claim 14, wherein the first level connector includes an first level metallic shell defining said first level card receiving space, the second level connector includes a second level metallic shell defining said second level card receiving space and said another second level connector includes another second level metallic shell defining said another second level card receiving space.

17. The electrical card connector assembly as claimed in claim 14, further including another first level connector mounted upon the first surface of the first printed circuit board, and defining another first level card receiving space essentially sandwiched between said first level card receiving space and the first printed circuit board.

18. The electrical card connector assembly as claimed in claim 9, wherein said first printed circuit board is positioned above the second printed circuit board.

19. The electrical card connector assembly as claimed in claim 18, wherein said first surface of the first printed circuit board and said first face of the second printed circuit board both face toward a same direction.

20. The electrical card connector assembly as claimed in claim 9, wherein said first surface of the first printed circuit board and said first face of the second printed circuit board both face toward a same direction.

* * * * *